United States Patent
Bushko et al.

(10) Patent No.: US 6,759,781 B1
(45) Date of Patent: Jul. 6, 2004

(54) ROTOR ASSEMBLY

(75) Inventors: Dariusz Antoni Bushko, Hopkinton, MA (US); Mehdi Kaveh, Westborough, MA (US); John P. Voccio, West Newton, MA (US); David D. Madura, Ashland, MA (US); Alexander Perez, Framingham, MA (US)

(73) Assignee: American Superconductor Corporation, Westborough, MA (US)

( * ) Notice: Subject to any disclaimer, the term of this patent is extended or adjusted under 35 U.S.C. 154(b) by 0 days.

(21) Appl. No.: 10/367,125

(22) Filed: Feb. 14, 2003

(51) Int. Cl.[7] .............................. H02K 17/00
(52) U.S. Cl. ...................... 310/208; 310/179
(58) Field of Search ........................ 310/208, 203, 310/179, 194, 52, 81

(56) References Cited

U.S. PATENT DOCUMENTS

| | | | |
|---|---|---|---|
| 3,682,017 A | * 8/1972 | Mayer | 74/573 R |
| 4,130,769 A | * 12/1978 | Karube | 310/46 |
| 4,146,804 A | * 3/1979 | Carr, Jr. | 310/52 |
| 4,203,048 A | * 5/1980 | Sato | 310/268 |
| 4,468,579 A | * 8/1984 | Suzuki | 310/208 |
| 5,210,452 A | * 5/1993 | Pratap et al. | 310/12 |
| 5,723,933 A | * 3/1998 | Grundl et al. | 310/266 |
| 5,744,896 A | * 4/1998 | Kessinger et al. | 310/268 |
| 2003/0048015 A1 | * 3/2003 | Tornquist et al. | 310/103 |

* cited by examiner

Primary Examiner—Thanh Lam
(74) Attorney, Agent, or Firm—Fish & Richardson P.C.

(57) ABSTRACT

A rotor assembly includes a substantially cylindrical support structure having at least one first region, and at least one second region. At least one rotor coil is positioned within each first region of the substantially cylindrical support structure. Each rotor coil includes a pair of distal end portions and a convex center portion, and the average mechanical density of the convex center portion is substantially equal to the average mechanical density of the distal end portions. The average mechanical density of the at least one first region is substantially equal to the average mechanical density of the at least one second region.

48 Claims, 7 Drawing Sheets

ROTOR ASSEMBLY

RELATED APPLICATIONS

The following applications are hereby incorporated by reference into the subject application as if set forth herein in full: (1) U.S. Pat. No. 5,777,420, issued Jul. 7, 1998, entitled "Superconducting Synchronous Motor Construction"; (2) U.S. Pat. No. 6,489,701, issued Dec. 3, 2002, entitled "Superconducting Rotating Machine"; (3) U.S. Pat. No. 6,420,842, issued Jul. 16, 2002, entitled "Exciter and Electronic Regulator for Rotating Machinery"; (4) U.S. application Ser. No. 09/480,397, filed Jan. 11, 2000, entitled "Stator Construction For Superconducting Rotating Machines"; (5) U.S. application Ser. No. 09/481,480, filed Jan. 11, 2000, entitled "Internal Support for Superconducting Wires"; (6) U.S. application Ser. No. 60/266,319 filed Jan. 11, 2000, entitled "HTS Superconducting Rotating Machine"; (7) U.S. Pat. No. 6,347,522, issued Feb. 19, 2002, entitled "Cooling System for HTS Machines"; (8) U.S. Pat. No. 6,359,365, issued Mar. 19, 2002, entitled "Superconducting Synchronous Machine Field Winding Protection"; (9) U.S. application Ser. No. 09/632,600, filed Aug. 4, 2000, entitled "Exciter For Superconducting Rotating Machinery"; (10) U.S. application Ser. No. 09/632,602, filed Aug. 4, 2000, entitled "Segmented Rotor Assembly For Superconducting Rotating Machines"; (11) U.S. application Ser. No. 09/632,601, filed Aug. 4, 2000, entitled "Stator Support Assembly For Superconducting Rotating Machines"; (12) U.S. application Ser. No. 09/905,611, filed Jul. 13, 2001, entitled "Enhancement of Stator Leakage Inductance in Air-Core Machines"; (13) U.S. application Ser. No. 09/956,328, filed Sep. 19, 2001, entitled "Axially-Expandable EM Shield"; (14) U.S. application Ser. No. 10/083,025, filed Feb. 26, 2002, entitled "Tangential Torque Support"(15) U.S. application Ser. No. 09/909,412, filed Jul. 19, 2001, entitled "Torque Transmission Assembly For Use In Superconducting Rotating Machines"(16) U.S. Pat. No. 6,376,943, issued Apr. 23, 2002, entitled "Superconductor Rotor Cooling System" and (17) U.S. Application Ser. No. 10/128,535, filed Apr. 23, 2002, entitled "Superconductor Rotor Cooling System".

TECHNICAL FIELD

This invention relates to rotating machines.

BACKGROUND

Rotating machines typically include a stationary stator assembly and a rotor assembly that rotates within the stator assembly. The rotor assembly, which is typically cylindrical in shape, includes rotor coils that, during operation, are magnetically linked with armature coils incorporated into the stator assembly. During operation, the stator assembly generates a rotating magnetic field, resulting in the rotation of the rotor assembly. Or, if the rotor assembly is driven by an external machine, the rotating field assembly generates voltages and currents in the stationary stator assembly. As the rotor assembly rotates, it is subjected to radial centrifugal forces that may result in radial distortion of the rotor assembly.

SUMMARY

According to an aspect of this invention, a rotor assembly includes a substantially cylindrical support structure having at least one first region, and at least one second region. The rotor assembly further includes at least one rotor coil positioned within each first region of the substantially cylindrical support structure, with each rotor coil including a pair of distal end portions and a convex center portion, wherein the average mechanical density of the convex center portion is substantially equal to the average mechanical density of the distal end portions. Further, the average mechanical density of the first region is substantially equal to the average mechanical density of the second region.

One or more of the following features may be included. One or more of the rotor coils includes a mandrel positioned within an interior region of the rotor coil. The mandrel may occupy a portion of the interior region of the rotor coil and is constructed of a material (e.g., stainless steel, copper, aluminum, phenolic, etc.) having a mechanical density that is greater than the average mechanical density of the first and second regions. The mandrel may occupy the interior region of the rotor coil and is constructed of a material (e.g., stainless steel, copper, aluminum, phenolic, etc.) having a mechanical density that is substantially equal to the average mechanical density of the first and second regions.

The mandrel includes a pair of distal end portions spaced by a pair of convex center portions. The periphery of the distal end portions of the mandrel may be defined by a first radius and the periphery of the convex center portions of the mandrel may be defined by a second radius, such that the second radius is larger than the first radius. Alternatively, the mandrel may be elliptical in shape.

One or more of the second regions may include a member that occupies a portion of the second region and has a mechanical density that is greater than the average mechanical density of the first and second regions. Alternatively, one or more of the second regions may include a member that occupies the second region and has a mechanical density that is substantially equal to the average mechanical density of the first and second regions. These members may be constructed of stainless steel, copper, aluminum, phenolic, etc.

The rotor coils (e.g., racetrack-type or saddle-type coils) may be superconducting coils and include one or more high temperature superconducting windings. These rotor coils, which may or may not be cryogenically cooled, generate a magnetic flux path within the rotor assembly during operation. The substantially cylindrical support structure may define an internal volume that houses a magnetic material having high saturation flux density, which is positioned within at least a portion of the flux path and decreases the overall reluctance of the flux path generated by the rotor coils. This magnetic material within the internal volume may or may not be cryogenically cooled. The conductors within the rotor coil may be wound such that the lines of magnetic flux produced by the rotor coil proximate the convex center portions of the mandrel are essentially radially aligned toward an axial center of the rotor assembly.

The saddle-type coil may be configured such that the lines of magnetic flux produced by the saddle-type coil are perpendicular with a surface of the substantially cylindrical support structure and radially aligned toward an axial centerline of the rotor assembly.

One or more advantages can be provided from the above aspects of the invention. The use of a convex or elliptical mandrel results in rotor coils that have consistent mechanical densities. Further, by matching the average mechanical density of the mandrel to that of the rotor coil, rotor performance can be enhanced. Additional enhancement can be obtained by matching the density of the filler material to that of the rotor coil/mandrel combination. By matching the density of the various components of the rotor assembly, the high speed operation of the rotor can be enhanced, as radial distortion due to centrifugal forces is reduced. Additionally, the use of a magnetic core within the cylindrical support structure of the rotor can enhance magnetic performance by reducing reluctance.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
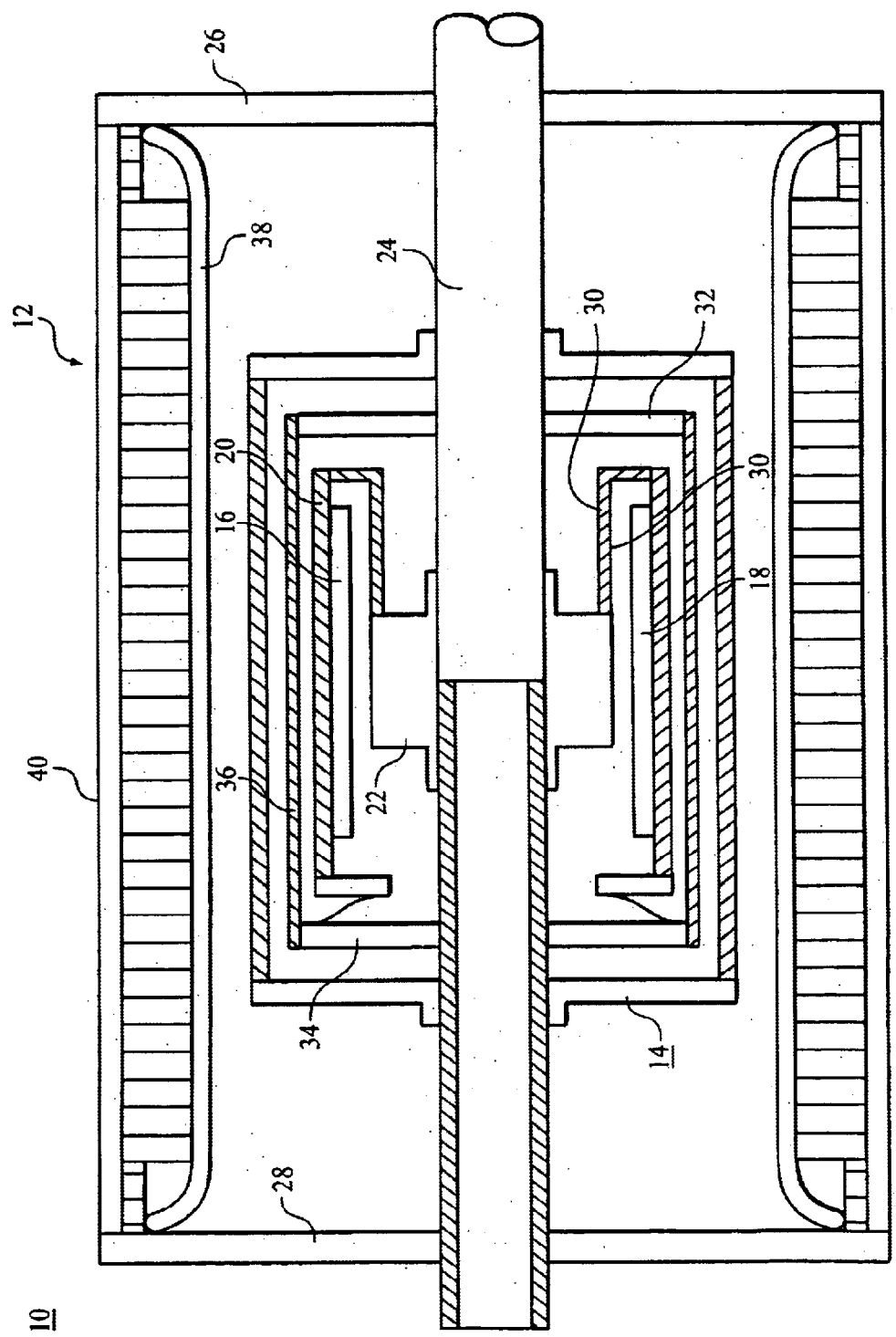
FIG. 1 is an cross-sectional view of a rotating machine.

Referring to FIG. 1, a rotating machine 10 includes a stator assembly 12 and a rotor assembly 14 having, in this embodiment, a four pole topology. Rotor assembly 14 rotates within stator assembly 12 and, in this four pole configuration, includes four diametrically-opposed rotor coils 16, 17, 18, 19 (only two of which are shown in this figure), which are mounted on a support structure 20, which is substantially cylindrical. The construction and configuration of rotor coils 16, 18, which have substantially equal average mechanical densities, will be discussed below in greater detail. By setting these mechanical densities so that they are substantially equal, non-uniform, radial distortion (or ovalization) of the cylindrical support structure 20 can be reduced.

Rotor assembly 14 includes a support member 22 attached to an output shaft 24, which is supported by a pair of bearing plates 26, 28, one at each end of rotor assembly 14. Support member 22 is typically fabricated from a high-strength, ductile, and non-magnetic material (e.g., stainless steel, copper, aluminum, phenolic, etc.). A torque tube 30 connects support member 22 to one of the two end plates 32, 34 of rotor assembly 14, thus establishing a torque path between support structure 20 and output shaft 24. The details of one embodiment of torque tube 30 are described in U.S. application Ser. No. 09/909,412, filed Jul. 19, 2001, entitled "Torque Transmission Assembly For Use In Superconducting Rotating Machines".

A vacuum chamber sleeve 36 surrounds the rotor coils 16, 18 and support structure 20. The ends of vacuum chamber sleeve 36 are connected to end plates 32, 34. Typically, vacuum chamber sleeve 36 is relatively thin (e.g., ³⁄₁₆″) and is constructed of stainless steel. When vacuum chamber sleeve 36 is connected to the end plates, an air-tight chamber is formed which encloses the rotor coils 16, 18. This air-tight chamber may be evacuated, thus forming a vacuum within the chamber. This helps to insulate the cooler rotor coils 16, 18 from the warmer output shaft 24.

Stator assembly 12 includes an armature winding 38 (e.g., a three phase stator winding) that is surrounded by an electromagnetic shield 40. Electromagnetic shield 40 is typically constructed of a non-magnetic material, such as copper, aluminum, phenolic, or stainless steel.

In the case of a synchronous motor, during operation of rotating machine 10, a voltage source (not shown, e.g., a generator, a utility line, etc.) provides a supply voltage to armature winding 38. Field energy is applied to rotor coils 16, 18. The field energy is typically a DC current, as rotor coils 16, 18 require a DC current to generate the magnetic field (and the magnetic flux) needed to link the rotor assembly 14 and the stator assembly 12. However, if the field energy applied to rotor coils 16, 18 is an AC current, a rectifier/thyristor circuit (not shown) is employed to convert the AC current into a DC current.

Rotor coils 16, 18 may be non-superconducting windings (e.g., copper windings) or HTS (High Temperature Superconductor) windings. Examples of HTS conductors are: thallium-barium-calcium-copper-oxide; bismuth-strontium-calcium-copper-oxide; mercury-barium-calcium-copper-oxide; yttrium-barium-copper-oxide, and magnesium diboride.

As superconducting conductors only achieve their superconducting characteristics when operating at low temperatures (e.g., <100 Kelvin.), if such superconducting conductors are employed, rotating machine 10 includes a cryogenic cooler (not shown), which maintains the operating temperature of rotor coils 16, 18 at an operating temperature sufficiently low to enable the conductors to exhibit their superconducting characteristics. The details of embodiments of the cryogenic cooler (not shown) are described in: U.S. Pat. No. 6,347,522, issued Feb. 19, 2002, entitled "Cooling System for HTS Machines"; U.S. Pat. No. 6,376,943, issued Apr. 23, 2002, entitled "Superconductor Rotor Cooling System"; and U.S. application Ser. No. 10/128,535, filed Apr. 23, 2002, entitled "Superconductor Rotor Cooling System".

Figure 2:
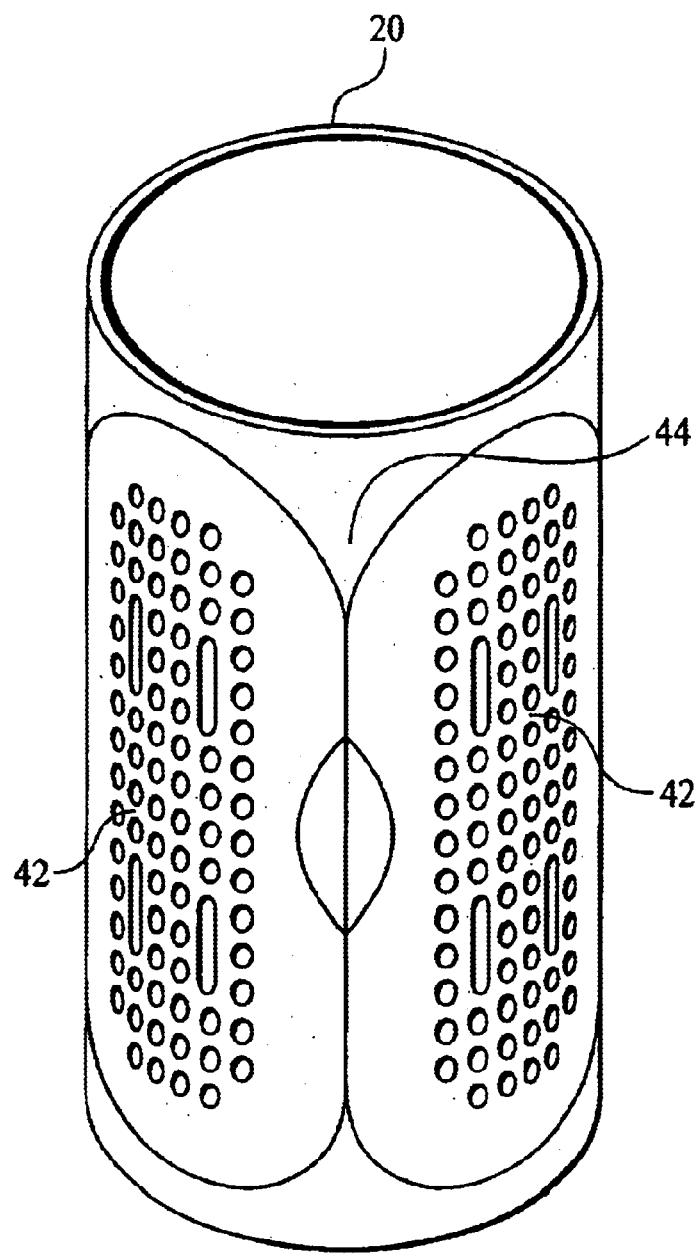
FIG. 2 is an isometric view of a portion of the rotor assembly of the rotating machine of FIG. 1.

Referring also to FIG. 2, a rotor support structure 20, which is typically constructed of stainless steel is included, upon which are disposed rotor coils and filler material that define two regions. The first of the regions 42 receives rotor coils (i.e., "coil" regions), and the second of the regions 44 do not receive rotor coils (i.e., "filler" regions). The rotor coils and filler material are conformed to the shape of the rotor support structure. For this particular four pole embodiment, four rotor coils are included in rotor assembly 14. Therefore, rotor support structure 20 is divided into eight regions, four "coil" regions (one for each rotor coil), and four "filler" regions positioned between the four coil regions. Typically the material from which the "filler" regions are fabricated is referred to as filler material, as it fills the space or gap between the rotor coils.

Figure 3:
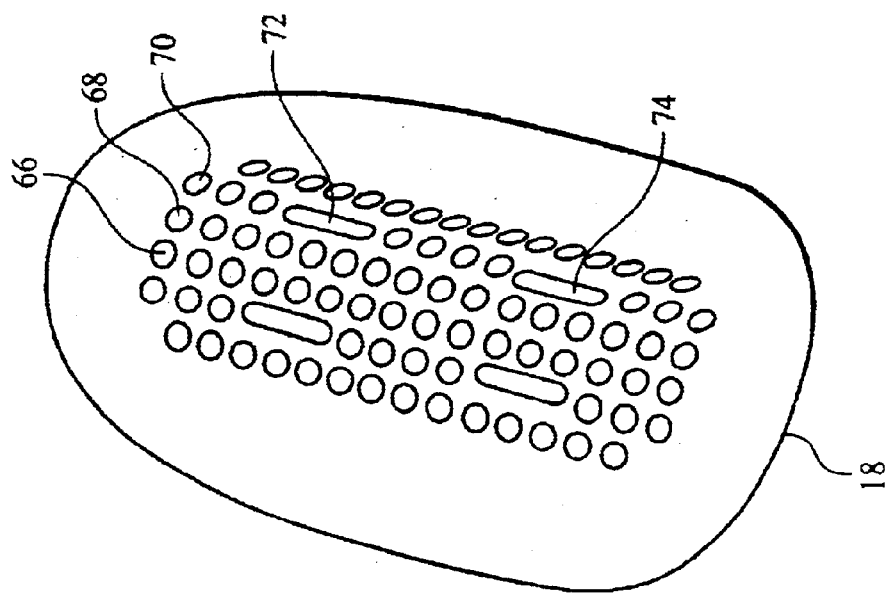
FIG. 3 is an isometric view of a rotor coil and mandrel of the rotating machine of FIG. 1.
Figure 3:
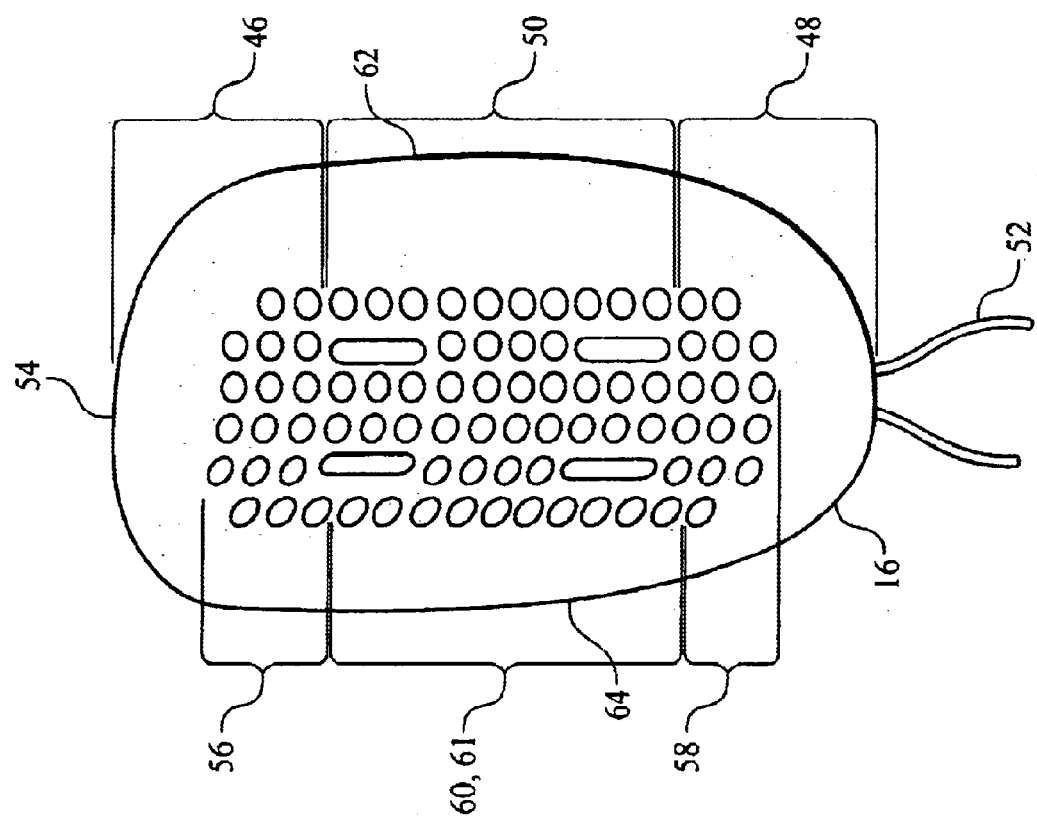

Referring also to FIG. 3, two rotor coils 16, 18 (of the four rotor coils included in rotor assembly 14) each include a pair of distal end portions 46, 48 and a convex center portion 50. When rotor coils 16, 18 (which are typically saddle-type coils) are constructed, a conductor 52 (either superconducting or non-superconducting) is repeatedly wound around a mandrel (e.g., mandrel 54). Accordingly, mandrel 54 (which is typically constructed of stainless steel, copper, aluminum, phenolic, etc.) determines the final shape of the rotor coil, e.g., rotor coil 16.

Mandrel 54 includes a pair of distal end portions 56, 58 (one defining the top and one defining the bottom of mandrel 54) and a pair of convex center portions 60, 61 (one defining each side of mandrel 54). Accordingly, when the conductor 52 is wound around mandrel 54, the final shape of the rotor coils is determined by the mandrel 54 around which the conductor 52 is wound. The convex center portions 60, 61 of mandrel 54 has curved edges 62, 64 that are not parallel with each other and actually bulge out in the middle, such that the width of the middle of the pair of convex center portions is wider than the pair of convex center portions at either the top or bottom (i.e., where the pair of convex center portions 60, 61 abuts distal end portions 56, 58). The pair of convex center portions 60, 61 have a large radius of curvature (e.g., 50–100 inches), which is selected based on the stiffness of the conductor, the size of the coil, and/or the mechanical properties of the insulation system. The dimensions of the mandrel vary depending on the particular application and design on the machine. For a particular embodiment of machine 10, the mandrel is twelve inches long and eight inches wide, and the variation in width along the convex center portions of the mandrel is approximately one inch.

When conductor 52 is repeatedly wound around mandrel 54, the rotor coil 16, 18 is formed, such that the cross-section of any portion of this rotor coil includes numerous cross sections of conductor 52, due to the conductor being repeatedly looped around the mandrel. When forming rotor coils 16, 18, the number of times that conductor 52 is wound around mandrel 54 varies depending on the design and application of machine 10. For a particular embodiment of machine 10, conductor 52 is wound around mandrel 54 one-hundred-eighty times.

When conductor 52 is wound around the distal end portions of mandrel 54, the conductor loop is compressed such that the individual loops of the conductor within the rotor coil are compressed together. The amount of compression is inversely proportional to the radius of curvature of the mandrel. As the periphery of the distal end portions 56, 5.8 of mandrel 54 are defined by a smaller radius than the periphery of the convex center portions 60, 61, the level of compression experienced by the conductor proximate the distal end portions 56, 58 of mandrel 54 is greater than the level of compression experienced by the conductors proximate the convex center portions 60, 61. In one particular embodiment of the rotor coil, the compression level of the conductors proximate the distal end portions 56, 58 may be as high as 2.0 lb/in$^2$ (for a mandrel with distal end portions having a 5" radius), while the compression level of the conductors proximate the convex center portions 60, 61 may be 0.20 lb/in$^2$.

This type of coil/mandrel configuration will provide an essentially uniform average turn thickness around the coils and, hence, improve the mechanical properties of the rotor coils. Additionally, this coil/mandrel configuration minimizes variations in tilt of the conductor, thus improving the repeatability of the coil thickness. Further, this configuration reduces the requirement for vertical clamping during coil fabrication and provides for lower cost mold equipment. Also, this configuration increases the area enclosed by the coil for a given external coil envelope, thus increasing coil dipole moment (and the torque produced). In short, this configuration allows for faster and less expensive coil fabrication, while improving coil performance.

By using convex center portions 60, 61, as opposed to center portions having parallel sides, the level of compression experienced by the conductors proximate the convex center portions 60, 61 is enhanced, as the tension of the conductor that is wound around the mandrel is converted to a compressive force in which the conductors are compressed radially toward the center of the mandrel 54. Accordingly, due to the use of convex center portions 60, 61, the variation in compression of the conductors looped around the mandrel is reduced, resulting in the distal end portions 46, 48 and convex center portion 50 of the rotor coil having substantially equal mechanical densities. For a particular embodiment of the rotor coil, the average mechanical density is 0.20 pounds per cubic inch (for glass conductor insulation) and 0.22 pounds per cubic inch (for paper conductor insulation).

By substantially equalizing the mechanical density of the various portions of the rotor coils 16, 18, the rotation of rotor assembly 14 will have an equal effect on all portions of the rotor coils. For example, in a high-revolution, four-pole, 60-hertz application (such as a generator), the rotor assembly spins at 3,600 rpm. As this rotor assembly 14 spins, the various components of the rotor assembly are subjected to centrifugal forces that vary based on the density of these rotor assembly components. Therefore, by equalizing the density of the portions 46, 48, 50 of the rotor coils 16, 18, the centrifugal forces acting on these portions are also equalized, resulting in these components (i.e., rotor coils 16, 18) of the rotor assembly 14 being balanced, and the non-uniform radial distortion of the rotor assembly 14 being reduced.

By matching the mechanical density of the rotor coil 16, 18 to the mechanical density of the mandrel 54, the rotor assembly can be further balanced and its performance further enhanced. Specifically, if the mandrel has a higher density than the rotor coil surrounding it, during operation, the mandrel is subjected to greater centrifugal forces than the lower density rotor coil. Accordingly, non-uniform, radial distortion (or ovalization) occurs, as the mandrel is radially pulled away from the axis of rotation of the rotor assembly at a greater rate than the rotor coil surrounding it.

There are several ways to match the mandrel density to that of the average density of the rotor coil. The mandrel 54 may be constructed of a material that has a density substantially equal to the average density of the rotor coil. For example, if the average mechanical density of the rotor coil is 0.20 pounds per cubic inch, the mandrel can be constructed from a material having a substantially equal mechanical density.

If such a material is not available, a higher density material (e.g., stainless steel, copper, aluminum, phenolic, etc.) may be used, provided the material is processed to lower its average mechanical density. For example, if the mandrel is going to be constructed of stainless steel having a mechanical density of 0.30 pounds per cubic inch, the mandrel can be machined so that, on average, one third of the material of the mandrel is removed. This can be accomplished by machining holes 66, 68, 70 and/or slots 72, 74 into the mandrel, such that the surface area of mandrel 54 is reduced by the appropriate percentage. For example, if the desired mandrel density is 0.20 lbs./inch$^3$ and the actual mandrel density is 0.30 lbs./inch$^3$, the actual density of the mandrel is 50% greater than required. Therefore, when machining in the holes and/or slots into the mandrel, the holes and/or slots should occupy one-third of the mandrel's surface area. When machining these holes and/or slots, their size should be kept to a minimum and spatial frequency kept to a maximum to homogenize the density distribution throughout the mandrel. A typical example of the size and spatial frequency of these holes is one-half inch diameter holes on two inch centers.

An alternative way of reducing the density of the mandrel is to reduce the thickness of the mandrel by the requisite amount. Accordingly, if the mandrel was reduced in thickness by one third, the same net result would be achieved, as the average density of the mandrel would be reduced by one-third.

Figure 4:
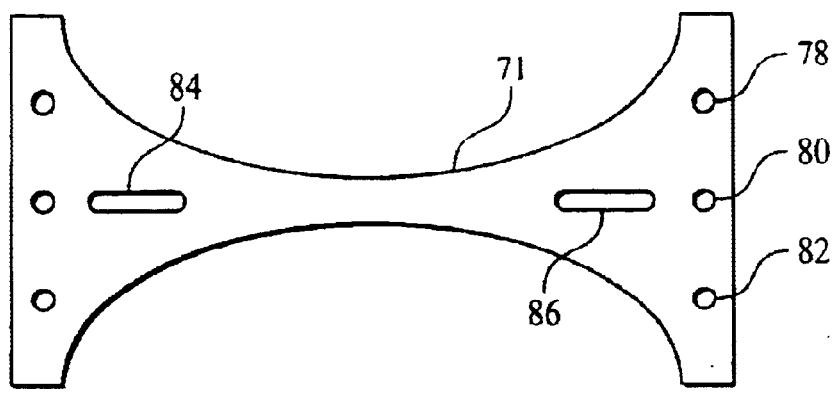
FIG. 4 is an plan view of the filler material of the rotating machine of FIG. 1.

As stated above, rotor support stricture 20 is divided into two types of regions, "coil" regions 42 and "filler" regions 44, such that the "coil" regions 42 receive one or more rotor coils and the "filler" regions 44 receive a filler material (e.g., stainless steel, copper, aluminum, phenolic, etc.) that fills the space or gap between the rotor coils (i.e., the "coil" regions 42). Referring also to FIG. 4, filler material 76 is typically a substantially hour-glass shaped piece of stainless steel that is rolled to the appropriate radius of rotor support structure 20, so as to accommodate the shape of the rotor coils and the support structure.

Rotor assembly 14 may be further balanced and performance further enhanced by matching the mechanical density of the filler material 76 (i.e., the "filler" region) to that of the rotor coil 16, 18 and mandrel 54. As explained above, if the filler material 76 has a higher mechanical density than the rotor coil/mandrel combination, during operation, the filler material 76 is subjected to greater centrifugal forces than the lower density rotor coil/mandrel combination. Accordingly, non-uniform, radial distortion (or ovalization) occurs, as the filler material 76 is radially pulled away from the axis of rotation of rotor assembly 14 at a greater rate than the rotor coil/mandrel combination. As with the mandrel 54, there are several ways to match the filler material mechanical density to that of the average mechanical density of the rotor coil/mandrel combination.

The filler material 76 may be constructed of a material that has a density substantially equal to the average density of the rotor coil/mandrel combination. Alternatively, a higher density material, such as stainless steel, copper, aluminum, or phenolic, may be used, provided the material is machined to lower its average mechanical density. As explained above, this may be accomplished by, for example, machining holes 78, 80, 82 and/or slots 84, 86 in filler material 76, such that the surface area of the filler material is reduced by the appropriate percentage. When machining these holes and/or slots, their size should be kept to a minimum and spatial frequency kept to a maximum to homogenize the density distribution throughout the filler material. A typical example of the size and spatial frequency of these holes is one-half inch diameter holes on two inch centers.

An alternative way of reducing the density of the filler material 76 is to reduce its thickness by the requisite amount. Accordingly, if the density of the filler material needs to be reduced by one-third, the thickness of the filler material 76 could be reduced by one-third and tie required mechanical density reduction would be achieved.

While armature winding 38 is described above as a three-phase armature winding, other configurations are possible. For example, armature winding 38 may be a single-phase armature winding.

While the mandrel 54 is described above as having a pair of distal end portion 56, 58 having a first radius and a pair of convex center portions 60, 61 having a second radius, other configuration are possible. For example, mandrel 54 may be elliptical in shape and, therefore, have a continually varying radius.

Figure 5:
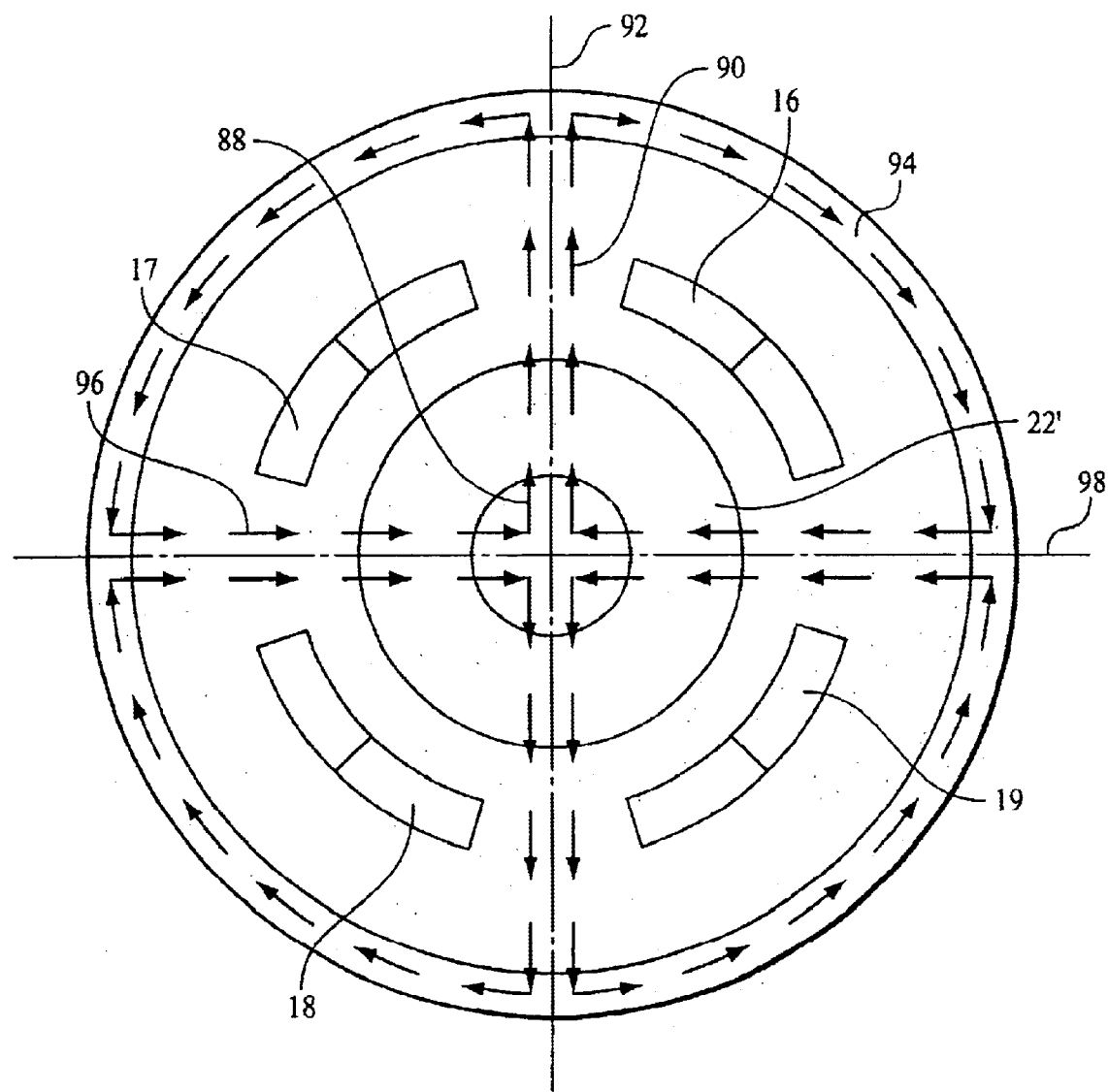
FIG. 5 is a diagrammatic representation illustrating the flux paths in the rotating machine of FIG. 1.

While support member 22 is described above as being fabricated of a non-magnetic material (e.g., aluminum), support member 22 may be constructed of a magnetic material (e.g., iron). Referring also to FIG. 5, in an alternative embodiment, support member is an iron core 22' formed from a series of stacked laminations. The stacked laminations, which may or may not be cooled by the cryogenic cooler, are placed within the inner volume of the cylindrical support structure 20. The torque tube 30 is then allowed to cool so that the tube shrinks around the laminations, capturing the laminations in a compressed state within the tube. Torque tube 30 may also be "shrink welded" to preload the torque tube around the iron core.

Although a solid iron core may be used, a stacked set of laminations is preferable so that if one of the laminations cracks, the crack is isolated to that lamination and will not propagate to neighboring laminations. Cracking in the iron core can be a serious concern if the non-ductile iron core is cryogenically cooled along with the rotor coils 16, 17, 18, 19. At cryogenically-low temperatures, the brittleness characteristic of the iron is increased. In order to increase the ductile strength of the laminated structure in the radial direction, reinforcing layers (e.g., fiberglass or stainless steel) may be placed between the laminations. The laminations and reinforcing layers can then be impregnated with, for example, epoxy.

The positioning the iron core 22' within the torque tube provides significant advantages in the operation of the rotating machine 10. When positioning iron core 22', the rotor coils should be positioned in close radial proximity to iron core 22'. In order to appreciate these advantages, a simplistic representation of the flux paths generated by each of the rotor coils superconducting windings is shown. One of the four flux paths corresponding to the upper left-hand quadrant, starts at a point 88 in the iron core 22', extends in a path 90 running generally parallel with axis 92 until it encounters the back iron member 94 which provides a low impedance path. At this point, the flux path extends counterclockwise through the back iron member and, then back along a path 96 parallel to axis 98 toward point 88 to close the loop. The flux paths for the remaining quadrants extend away from the iron core, through the back iron member and back to the iron core in similar fashion.

It is apparent from FIG. 5 that a significant portion of the flux path passes through the iron core 22' positioned within the inner volume of the support structure 20. Because iron is a high saturation flux density material (i.e., approximately 2.0 Tesla), it acts, in a sense, as a magnetic short circuit so as to reduce the overall reluctance of the flux path and increase the amount of flux generated for a given number of ampere-turns of the windings. Thus, a lower-loss magnetic circuit is provided resulting in a more efficient motor.

Figure 6:
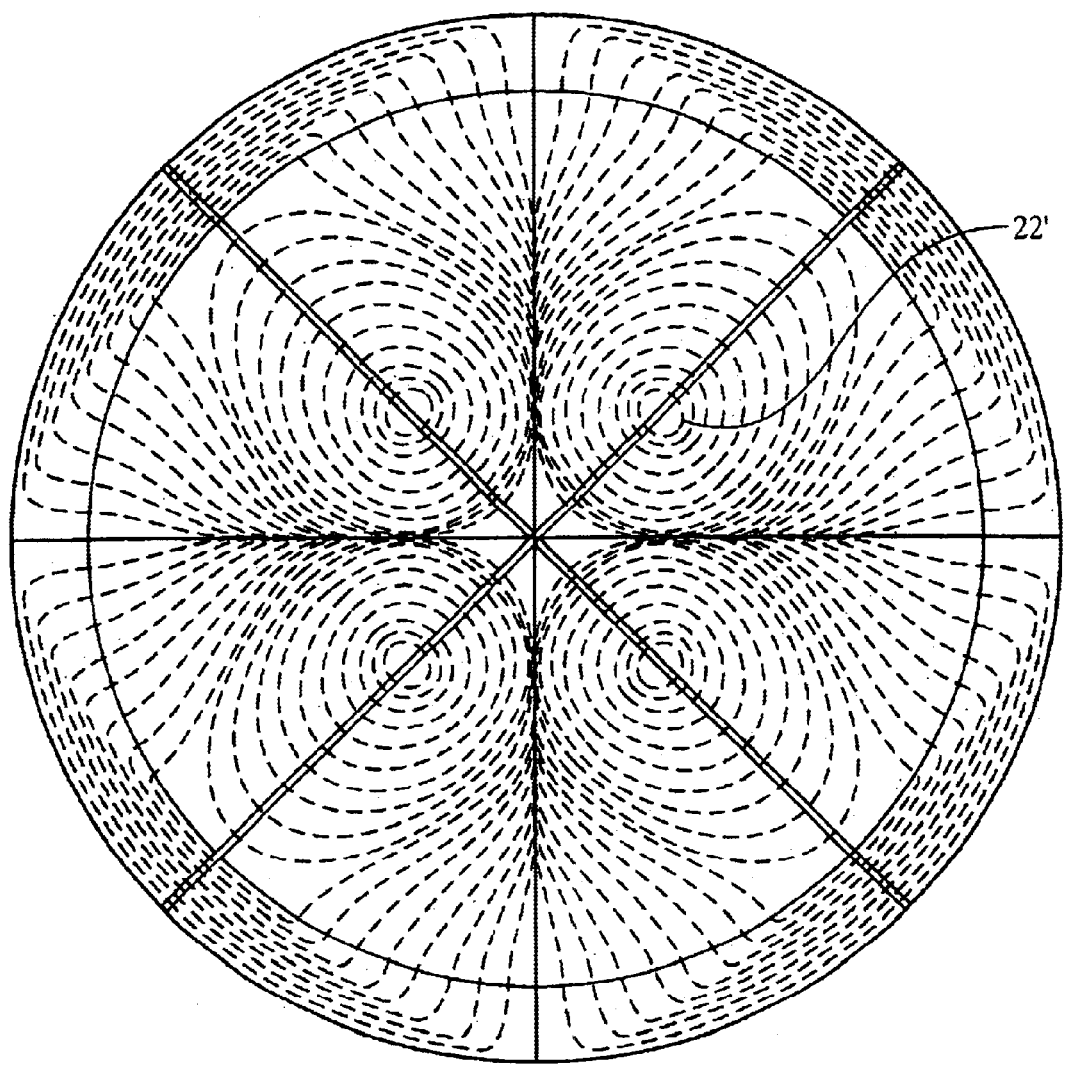
FIG. 6 is a plot diagram showing the magnetic field distribution within the rotor assembly of the rotating machine of FIG. 1.

Referring also to FIG. 6, a plot showing the magnetic field distribution within the rotor assembly 14 shows the increased flux flowing through the iron core 22'.

While rotor coils 16, 18 are described above as including a convex center portion 50, other configurations are possible. For example, the center portion may have parallel sides and, therefore, the center portion would be rectangular in shape, as opposed to convex.

Figure 7:
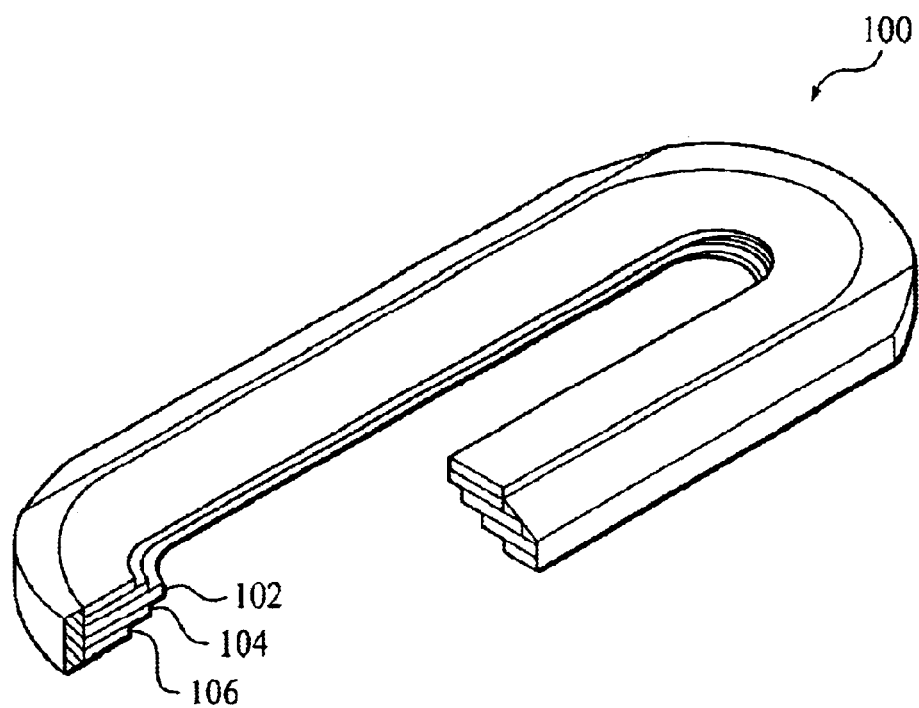
FIG. 7 is an alternative embodiment of the rotor coil of the rotating machine of FIG. 1.

While rotor coils 16, 18 are described above as being saddle-type coils, other configurations are possible, such as the racetrack-type rotor coil configuration 100 shown in FIG. 7. Racetrack-type coil 100 is typically constructed of several coil windings (e.g., windings 102, 104, 106) that are stacked on top of each other.

Figure 8:
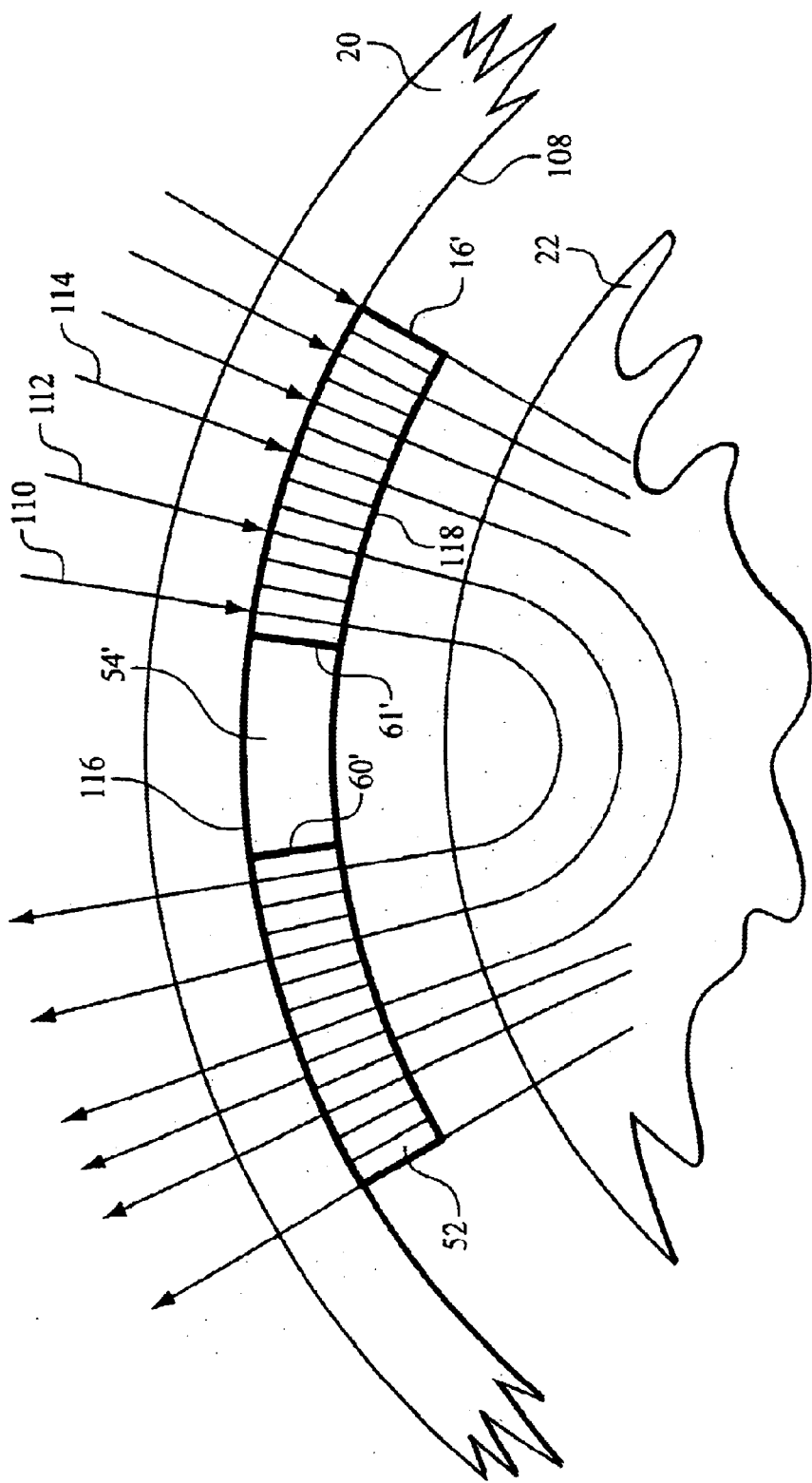
FIG. 8 is a cross-sectional view of an alternative embodiment of the rotor coil and mandrel of FIG. 3.

Referring also to FIG. 8, there is shown a cross-sectional view of an alternative embodiment of the rotor coil 16' in which the conductor 52 used to wind the rotor coil is wound around a mandrel 54', such that the periphery of the convex center portions 60', 61' of the mandrel 54' is perpendicular to the surface 108 of the rotor support structure 20. Accordingly, the individual conductors positioned proximate the convex center portions 60', 61' of the mandrel 54' are perpendicular to the surface 108 of the rotor support structure 20. As conductors 52 have a rectangular cross-sectional shape, the broad face of the conductor 52 is also positioned perpendicular to the surface 108 of the rotor support structure 20. Accordingly, this rotor coil configuration radially aligns (i.e., toward the axial centerline of the rotor assembly) the lines of magnetic flux (e.g., flux lines 110, 112, 114) produced by the individual conductors wound around the mandrel 54', as the lines of magnetic flux are parallel with the broad face of conductor 52. By radially aligning the line of magnetic flux so that the flux lines perpendicularly strike iron core 22, magnetic efficiency is enhanced. Additionally, as this coil configuration produces a rotor coil having a convex exterior surface 116, the rotor coil can be positioned tightly against the rotor support structure. Further, the concave interior surface 118 of this configuration of the rotor coil allows it to be positioned in close proximately with iron core 22.

A number of embodiments of the invention have been described. Nevertheless, it will be understood that various modifications may be made without departing from the spirit and scope of the invention. Accordingly, other embodiments are within the scope of the following claims.

What is claimed is:

1. A rotor assembly comprising:
   a substantially cylindrical support structure having at least one first region and at least one second region; and
   at least one rotor coil positioned within each first region of the substantially cylindrical support structure, each rotor coil including a pair of distal end portions, and a convex center portion:
   wherein the average mechanical density of the convex center portion is substantially equal to the average mechanical density of the distal end portions;
   wherein the average mechanical density of the at least one first region is substantially equal to the average mechanical density of the at least one second region.

2. The rotor assembly of claim 1 wherein one or more of the rotor coils includes a mandrel positioned within an interior region of the rotor coil.

3. The rotor assembly of claim 2 wherein the mandrel occupies a portion of the interior region of the rotor coil and is constructed of a material having a mechanical density that is greater than the average mechanical density of the first and second regions.

4. The rotor assembly of claim 2 wherein the mandrel occupies the interior region of the rotor coil and is constructed of a material having a mechanical density that is substantially equal to the average mechanical density of the first and second regions.

5. The rotor assembly of claim 2 wherein the mandrel is constructed of a material chosen from the group consisting of stainless steel, aluminum, phenolic, and copper.

6. The rotor assembly of claim 2 wherein the mandrel includes a pair of distal end portions spaced by a pair of convex center portions.

7. The rotor assembly of claim 6 wherein the periphery of the distal end portions of the mandrel are defined by a first radius, and the periphery of the convex center portions of the mandrel are defined by a second radius that is larger than the first radius.

8. The rotor assembly of claim 2 wherein the mandrel is an elliptical mandrel.

9. The rotor assembly of claim 1 wherein one or more of the second regions include a member that occupies a portion of the second region and has a mechanical density that is greater than the average mechanical density of the first and second regions.

10. The rotor assembly of claim 9 wherein the member is constructed of a material chosen from the group consisting of stainless steel, aluminum, phenolic, and copper.

11. The rotor assembly of claim 1 wherein one or more of the second regions include a member that occupies the second region and has a mechanical density that is substantially equal to the average mechanical density of the first and second regions.

12. The rotor assembly of claim 11 wherein the member is constructed of a material chosen from the group consisting of stainless steel, aluminum, phenolic, and copper.

13. The rotor assembly of claim 1 wherein the rotor coil is a racetrack-type coil.

14. The rotor assembly of claim 1 wherein the rotor coil is a saddle-type coil.

15. The rotor assembly of claim 14 wherein the saddle-type coil is configured such that the lines of magnetic flux produced by the saddle-type coil are perpendicular with a surface of the substantially cylindrical support structure and radially aligned toward an axial centerline of the rotor assembly.

16. The rotor assembly of claim 1 wherein the rotor coil is a superconducting rotor coil.

17. The rotor assembly of claim 16 wherein the superconducting rotor coil includes one or more high temperature superconducting windings.

18. The rotor assembly of claim 1 wherein the at least one rotor coil, during operation, generates a magnetic flux path within the rotor assembly, and the substantially cylindrical support structure defines an internal volume, the rotor assembly further comprising:
   a magnetic material having high saturation flux density, positioned within the internal volume of the substantially cylindrical support structure and at least a portion of the flux path, for decreasing the overall reluctance of the flux path generated by the at least one rotor coil.

19. The rotor assembly of claim 18 wherein the magnetic material within the internal volume is cryogenically cooled.

20. The rotor assembly of claim 18 wherein the magnetic material within the internal volume is not cryogenically cooled.

21. A rotor assembly comprising:
   a substantially cylindrical support structure having at least one first region and at least one second region; and
   at least one rotor coil positioned within each first region of the substantially cylindrical support structure;
   wherein the average mechanical density of the at least one first region is substantially equal to the average mechanical density of the at least one second region.

22. The rotor assembly of claim 21 wherein one or more of the rotor coils includes a mandrel positioned within an interior region of the rotor coil.

23. The rotor assembly of claim 22 wherein the mandrel occupies a portion of the interior region of the rotor coil and is constructed of a material having a mechanical density that is greater than the average mechanical density of the first and second regions.

24. The rotor assembly of claim 22 wherein the mandrel occupies the interior region of the rotor coil and is constructed of a material having a mechanical density that is substantially equal to the average mechanical density of the first and second regions.

25. The rotor assembly of claim 22 wherein the mandrel is constructed of a material chosen from the group consisting of stainless steel, aluminum, phenolic, and copper.

26. The rotor assembly of claim 21 wherein one or more of the second regions include a member that occupies a portion of the second region and has a mechanical density that is greater than the average mechanical density of the first and second regions.

27. The rotor assembly of claim 26 wherein the member is constructed of a material chosen from the group consisting of stainless steel, aluminum, phenolic, and copper.

28. The rotor assembly of claim 21 wherein one or more of the second regions include a member that occupies the second region and has a mechanical density that is substantially equal to the average mechanical density of the first and second regions.

29. The rotor assembly of claim 28 wherein the member is constructed of a material chosen from the group consisting of stainless steel, aluminum, phenolic, and copper.

30. The rotor assembly of claim 21 wherein the rotor coil is a racetrack-type coil.

31. The rotor assembly of claim 21 wherein the rotor coil is a saddle-type coil.

32. The rotor assembly of claim 31 wherein the saddle-type coil is configured such that the lines of magnetic flux produced by the saddle-type coil are perpendicular with a surface of the substantially cylindrical support structure and radially aligned toward an axial centerline of the rotor assembly.

33. The rotor assembly of claim 21 wherein the rotor coil is a superconducting rotor coil.

34. The rotor assembly of claim 33 wherein the superconducting rotor coil includes one or more high temperature superconducting windings.

35. The rotor assembly of claim 21 wherein the at least one rotor coil, during operation, generates a magnetic flux path within the rotor assembly, and the substantially cylindrical support structure defines an internal volume, the rotor assembly further comprising:
a magnetic material having high saturation flux density, positioned within the internal volume of the substantially cylindrical support structure and at least a portion of the flux path, for decreasing the overall reluctance of the flux path generated by the at least one rotor coil.

36. The rotor assembly of claim 35 wherein the magnetic material within the internal volume is cryogenically cooled.

37. The rotor assembly of claim 35 wherein the magnetic material within the internal volume is not cryogenically cooled.

38. A rotor coil comprising:
a mandrel including a pair of distal end portions spaced by a pair of convex center portions; and
a winding assembly wound around the mandrel, the winding assembly including a pair of distal end portions, and a convex center portion;
wherein the average mechanical density of the convex center portion and the distal end portions of the winding assembly are substantially equal.

39. The rotor coil of claim 38 wherein the periphery of the distal end portions of the mandrel are defined by a first radius, and the periphery of the convex center portions of the mandrel are defined by a second radius that is larger than the first radius.

40. The rotor coil of claim 38 wherein the mandrel is an elliptical mandrel.

41. The rotor coil of claim 38 wherein the rotor coil is a racetrack-type coil.

42. The rotor coil of claim 38 wherein the rotor coil is a saddle-type coil.

43. The rotor coil of claim 42 wherein the saddle-type coil is configured such that the lines of magnetic flux produced by the saddle-type coil are radially aligned toward an axial centerline of a rotor assembly.

44. The rotor coil of claim 38 wherein the winding assembly includes one or more conductors wound around the mandrel.

45. The rotor coil of claim 44 wherein the one or more conductors are superconducting conductors.

46. The rotor coil of claim 45 wherein the superconducting conductors are constructed of a high temperature superconducting material.

47. A rotating machine comprising:
a stator assembly including at least one stator winding; and
a rotor assembly configured to rotate within the stator assembly, the rotor assembly including:
a substantially cylindrical support structure having at least one first region and at least one second region; and
at least one rotor coil positioned within each first region which, in operation, generates a magnetic flux linking the stator assembly;
wherein the average mechanical density of the at least one first region is substantially equal to the average mechanical density of the at least one second region.

48. A rotating machine comprising:
a stator assembly including at least one stator winding; and
a rotor assembly configured to rotate within the stator assembly, the rotor assembly including:
a substantially cylindrical support structure having at least one first region and at least one second region; and
at least one rotor coil positioned within each first region which, in operation, generates a magnetic flux linking the stator assembly, wherein each rotor coil includes a pair of distal end portions and a convex center portion;
wherein the average mechanical density of the convex center portion is substantially equal to the average mechanical density of the distal end portions;
wherein the average mechanical density of the at least one first region is substantially equal to the average mechanical density of the at least one second region.

* * * * *